United States Patent [19]

Sarkar

[11] Patent Number: 5,473,048
[45] Date of Patent: * Dec. 5, 1995

[54] THIOL STAR POLYMER CONTAINING CENTRAL HUB WITH MULTIPLE RADIATING ADDITION COPOLYMER STRUCTURES

[75] Inventor: Manish Sarkar, Windsor, England

[73] Assignee: Imperial Chemical Industries, PLC, United Kingdom

[ * ] Notice: The portion of the term of this patent subsequent to Dec. 28, 2010, has been disclaimed.

[21] Appl. No.: 662,029

[22] Filed: Feb. 28, 1991

[30]  Foreign Application Priority Data

Mar. 23, 1990 [GB] United Kingdom ............... 9006557

[51] Int. Cl.$^6$ .................. C08G 75/04; C08G 18/80; C08G 18/52; C08G 63/688
[52] U.S. Cl. .................. 528/376; 528/44; 528/45; 528/75; 528/76; 528/360; 528/374; 525/418; 525/451; 525/523; 525/535; 427/385.5; 427/386
[58] Field of Search .................. 528/45, 75, 360, 528/364, 375, 374, 376, 44, 76; 525/418, 451, 452, 523, 535; 427/385.5, 386

[56]  References Cited

U.S. PATENT DOCUMENTS

| | | | |
|---|---|---|---|
| 3,923,748 | 12/1975 | Hutt et al. | 528/75 |
| 4,130,522 | 12/1978 | McGinniss | 528/360 |
| 4,340,707 | 7/1982 | Quis | 526/289 |
| 4,429,099 | 1/1984 | Kennedy | 528/98 |
| 4,439,291 | 3/1984 | Irving | 528/192 |
| 4,558,120 | 12/1985 | Tomalia et al. | 528/363 |
| 4,568,737 | 2/1986 | Tomalia et al. | 528/425 |
| 4,587,329 | 5/1986 | Tomalia et al. | 528/425 |
| 4,610,898 | 9/1986 | Engel | 427/379 |
| 4,737,550 | 4/1988 | Tomalia | 528/374 |
| 4,857,599 | 8/1989 | Tomalia et al. | 528/374 |
| 5,041,516 | 8/1991 | Fréchet et al. | 528/85 |
| 5,274,064 | 12/1993 | Sarkar | 525/535 |

FOREIGN PATENT DOCUMENTS

| | | |
|---|---|---|
| 2944092 | 5/1981 | Germany . |
| 8600626 | 1/1986 | WIPO . |

OTHER PUBLICATIONS

Chemical Abstracts, vol. 100, No. 22, May, 1984, p. 38 Abstract No. 175857v.

*Primary Examiner*—James J. Seidleck
*Assistant Examiner*—Rabon Sergent
*Attorney, Agent, or Firm*—Thomas M. Schmitz

[57]  ABSTRACT

The invention provides a co-polymer having a hub portion from which radiate from 3 to 8 arms where the hub portion is the residue of a tri-functional to octa-functional thiol and each arm is an addition polymer comprising structural units and functional units that are mutually compatible, the functional units including crosslinking substituents capable of undergoing a crosslinking reaction with a crosslinking agent or crosslinking substituent in functional units in another molecule of the same polymer and optionally compatible auxiliary functional units that contain wetting groups.

20 Claims, No Drawings

THIOL STAR POLYMER CONTAINING CENTRAL HUB WITH MULTIPLE RADIATING ADDITION COPOLYMER STRUCTURES

This invention relates to certain novel co-polymers, their preparation and use in coating compositions.

The co-polymers of the present invention have an idealised structure that can be regarded as consisting of a number of arms that radiate from a central point. Polymers having such geometry are referred to colloquially as star polymers or polymers with star geometry.

We have now discovered a class of such polymers that have benefits in the manufacture of coating compositions.

According to the present invention there is provided a co-polymer having a hub portion from which radiate from 3 to 8 arms where the hub portion is the residue of a trifunctional to octa-functional thiol and each arm is an addition polymer comprising structural units, functional units that are mutually compatible, the functional units including crosslinking substituents capable of undergoing a crosslinking reaction with a crosslinking agent or with a crosslinking substituent in functional units in another molecule of the same polymer and optionally compatible auxiliary functional units that contain wetting groups.

The advantages of these polymers in coating compositions can at least in part depend upon the particular functional units employed and the crosslinking reaction they undergo. One advantage seen in particular with hydroxy functional star polymers and isocyanate crosslinking agents, is that compositions based on them have improved pot lives and gel times compared with compositions based on corresponding linear polymers. Further, a primer composition based on such a star polymer has improved sandability as compared to one based upon a commercial standard. Also and particularly at relatively high functionality a star polymer composition is, as compared with a commercial standard based on a linear polymer, relatively stable to ultra violet degradation. Further, waterborne compositions based on allyl functional and hydroxy functional star polymers display viscosities much lower than would be expected from their molecular weights whilst showing relatively improved film performance.

The co-polymers of this invention have a total molecular weight of at least 3,000. In practice, the molecular weight will not be more than 150,000. For example the molecular weight can be 3,000 to 30,000, particularly 3,000 to 15,000 the molecular weight is 5,000 to 10,000. The term 'molecular weight' here means the apparent total weight average molecular weight. Apparent molecular weight is measured by the gel permeation chromatography method described in Gel Chromatography: Theory, Methodology and Application, T Kremmer and L Boross, Wiley Interscience 1979.

The co-polymers of the invention have a hub portion that is the residue of a trifunctional to octafunctional thiol. In an idealised structure, an addition polymer arm extends from each thio moiety in the hub, hence the three to eight arms.

Preferably the hub is the residue of a trifunctional, tetrafunctional or hexafunctional thiol especially a tetra or hexafunctional thiol.

The trifunctional to octafunctional thiol can be aromatic or aliphatic. Examples of aromatic thiols are benzene-1,3,5-trithiol, 3,4,8,9-tetramercaptotetrathiafulvalene and 7-methyltrithiouric acid.

Preferably, the thiol residue is the residue of an ester formed from a trifunctional to octafunctional alcohol and a thio-$C_{2-6}$ alkanoic acid.

Examples of suitable alcohols are glycerol, sorbitol and especially alcohols having the general formula (1):

where $R^1$ is hydrogen, $C_{1-4}$ alkyl or hydroxy-$C_{1-4}$ alkyl, (especially methyl, ethyl, hydroxymethyl or hydroxyethyl) or a group of formula (2):

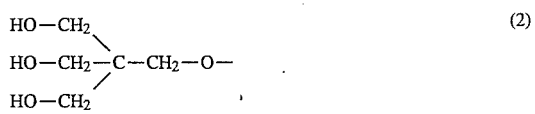

Examples of mercapto-$C_{2-6}$-alkanoic acids are 2-mercaptoacetic acid, 2-mercaptopropionic acid, 3-mercaptopropionic acid, 4-mercaptobutyric acid, 5-mercaptopentanoic acid and 6-mercaptohexanoic acid. Preferably the mercaptoalkanoic acid is 2-mercaptoacetic or 3-mercaptopropionic acid.

Each arm of the star co-polymer is made up of structural units, functional units that are mutually compatible and include crosslinking substituents capable of undergoing a crosslinking reaction with a crosslinking agent or with a crosslinking substituent in functional units in another molecule of the same polymer and optionally compatible auxiliary functional units containing wetting groups. As in conventional acrylic polymers, the distribution of such units is random.

The total average mole percentage of functional units and auxiliary functional units in the arms is from 10% to 70%, for example 25% to 50% or 60% to 70% particularly 30% to 40% of the arm. The average mole percentage of functional units in each arm is calculated from the mole percentage of total monomers making up the arms that is represented by the monomers that will provide the functional units.

The functional units that are selected for any particular polymer are chosen so as to be mutually compatible. This means that the substituents tend to undergo inter-molecular crosslinking reactions with a crosslinking agent or with a crosslinking substituents in functional units in another molecule in preference to intra-molecular reactions with crosslinking substituents in functional units in the same molecule.

Examples of crosslinking substituents are hydroxyl, carboxyl, isocyanate, blocked isocyanate, epoxy, allyloxyester and 2-hydroxy-3-allyloxy propyl ester groups.

Where the functional units contain the same crosslinking group, it is selected such that the crosslinking reaction requires a crosslinking agent or where self crosslinking takes place between different molecules in the same polymer, that the crosslinking reaction requires triggering for example by a catalyst.

So for example hydroxyl group-containing polymers require for example an isocyanate-containing cross-linking agent. 2-Hydroxy-3-allyloxypropyl ester groups generally require a cobalt catalyst for cross-linking with each other.

Where the polymer has two or more different types of functional unit or contains functional units and auxiliary functional units, the different crosslinking groups or the crosslinking groups and the wetting groups are chosen so that crosslinking is inter-molecular rather than intra-molecular. For example, where there are two such different types of functional units one type can contain hydroxy groups and the other carboxy groups, or hydroxy groups and blocked isocyanate groups, or hydroxy groups and epoxy groups, or carboxyl groups or salts thereof and allyl or 2-hydroxy-3-allyoxy propyl ester groups.

Examples of wetting groups for auxiliary functional units are 4-nitrobenzoyloxy and 4-aminobenzoyloxy and its acid addition salt derivatives. Examples of acid addition salts are hydrohalide salts especially hydrochloride or organic acid salts for example an acetic acid salt.

The functional units can be derived from hydroxy, carboxy, isocyanate, blocked isocyanate or epoxy group-containing ethylenic monomers, or from the reaction of a carboxyl group-containing unit with allyl alcohol or 1-allyoxy-2,3-epoxy propane.

Where the polymer contains carboxyl groups or salts thereof and 2-hydroxy-3-allyloxy propyl ester groups preferably the molar ratio of free acid or salt group to ester group is from 1 to 3 to 1 to 9 in particular 1 to 5.6 to i to 7.33. The ratio i to 3 means that 75 mole % of the carboxyl groups are esterified. The ratio 1 to 5.6 means 85% of the carboxyl groups are esterified, the ratio 1 to 7.33 means that 88% of the carboxyl groups are esterified and a ratio of 1 to 9 means that 90% of the carboxyl groups are esterified.

The carboxyl groups can form salts for example alkali metal, alkaline earth metal and ammonium salts especially lithium and sodium salts.

Where the co-polymer contains more than one functional unit, the unit present in the largest amount will not usually exceed 97 mole % of the total of the functional units. Usually it will not exceed 90 mole % of the total.

Where the co-polymer contains auxiliary functional units, the auxiliary functional unit will not be less than 0.5 or 1.3 mole % of the total functional units. Typically it will be 0.5 to 5 mole % especially 1 to 2 mole %.

Examples of hydroxyl group-containing monomers are allylalcohol and esters of formula (3):

$$CH_2=CR^1-CO_2R^2OH \quad (3)$$

where $R^1$ is hydrogen or methyl and $R^2$ is $C_{2-6}$ alkanediyl especially ethane-1,2-diyl, propane-1,3-diyl and butane-1,4-diyl.

Examples of carboxy group-containing monomers are acrylic, methacrylic and maleic acid and maleic anhydride.

Examples of isocyanato group-containing monomers are 2-(3-isopropenylphenyl)-2-isocyanatopropane and esters of formula (4):

$$CH_2=CR^1-CO_2R_2NCO \quad (4)$$

where $R^2$ and $R^3$ are as defined with reference to formula (3) especially where $R^1$ is methyl and $R^2$ is ethane-1,2-diyl.

Examples of blocked isocyanate group-containing monomers of formula (4) are monomers where the isocyanate group has been blocked with an alkanol, especially a $C_{1-10}$ alkanol, an alkoxyalkanol especially a $C_{1-3}$ alkoxy $C_{1-3}$ alkanol, an hydroxy ester, a keto ester, an oxime, a ketoxime, an optionally substituted phenol, a lactam (including cyclic lactams) and N-hydroxy imides especially cyclic N-hydroxy imides. Blocking groups of this type are described in Preparation, Polymerisation and Evaluation of Blocked Isocyanato-ethyl Methacrylate H. G Fravel Jr et al Ind. Eng. Chem. Prod. Res. Dev. 1984 23 586.

Examples of epoxy group-containing monomers are glycidyl acrylate and glycidyl methacrylate.

Examples of structural units are units derived from ethylenically unsaturated monomers in particular $C_{1-8}$ alkyl esters of acrylic and methacrylic acids, vinyl $C_{2-6}$ alkanoates and styrene and its $C_{1-4}$ alkyl analogues.

Examples of $C_{1-8}$ alkyl esters of acrylic and methacrylic acids are methyl methacrylate, ethyl methacrylate, propyl methacrylate, pentyl methacrylate, hexyl methacrylate, octyl methacrylate, ethyl acrylate, propyl acrylate, butyl acrylate, pentyl acrylate, hexyl acrylate, octyl acrylate and 2-ethylhexyl acrylate.

Examples of vinyl $C_{2-6}$ alkanoate esters are vinyl acetate, vinyl propionate and vinyl butanoate.

Examples of styrene and its $C_{1-4}$ alkyl analogues are 4-methylstyrene and 4-ethylstyrene.

Preferably the structural units are derived from methyl methacrylate, ethyl methacrylate butyl methacrylate and butyl acrylate.

The identity and proportion of monomers directly affects the glass transition temperature (Tg) of the film forming polymer, therefore monomers and their proportions are selected to achieve a calculated glass transition temperature which is appropriate to the end use to which the film forming polymers are to be put. The Tg is calculated using the Fox equation as described in Polymer Science, V R Growariker, N V Viswanathan and Jayadev Greedhar 170, John Wiley and Sons (1986).

The identity and proportion of the monomers from which the functional units are derived is limited as previously discussed. Variations in Tg are therefore achieved by selection of the appropriate proportions of monomers providing structural units.

Co-polymers of the invention can have a wide range of Tg's for example, $-5°$ to $+100°$ C. Co-polymers having a Tg in the range of $-5°$ to $55°$ C. are particularly useful in paints for respraying motor vehicles. Co-polymers having a Tg in the range $+45°$ to $100°$ C. are particularly useful in the preparation of paints for painting motor vehicles especially in a vehicle manufacturing line.

The co-polymers of the present invention can be prepared by a process which comprises reacting together at moderate to elevated temperatures, a tri- to octa-functional thiol chain transfer agent with ethylenically unsaturated monomers that polymerise to form structural units, ethylenically unsaturated monomers that polymerise to form functional units and optionally ethylenically unsaturated monomers that polymerise to form auxiliary functional units thereby forming a co-polymer and optionally thereafter, where a salt or ester is required, salifying or co-reacting a polymer so formed containing functional units having carboxyl groups with allylalcohol or 1-allyloxy-2,3-epoxypropane or optionally reacting a co-polymer so formed containing functional units having epoxy groups with 4-nitrobenzoic acid or 4-aminobenzoic acid and optionally converting the product so obtained into an acid addition salt.

The reaction is carried out in the presence of an initiator for the free radical reaction for example, a per ester for example t-butyl perbenzoate, t-butyl per-2-ethyl hexanoate or azobisisobutyronitrile.

Preferably the reaction is carried out in such a way that the molecular weight distribution of the polymer product is small. This can be achieved by producing a high radical flux at the beginning of reaction. This in turn is achieved either by using a fast initiator, that is one that produces a large number of free radicals very quickly, or a relatively slow initiator, and adding monomer to an excess of the initiator.

The particular process employed depends on the monomers to be polymerised and the properties looked for in the end product. The precise combination of monomer and initiator can be determined in any particular case by routine experimentation.

The polymerisation reaction is carried out at moderate to elevated temperature. The precise temperature depends upon the specific initiator employed and the monomers to be polymerised. Usually the reaction is carried out at from 70° to 170° C. especially from 100° to 140° C.

The post-esterification and epoxide ring opening can be carried out at moderate temperatures for example ambient temperature optionally in the presence of a catalyst.

The polymerisation reaction and the post esterification reaction with are carried out in the presence of a non-interfering solvent or diluant for example a high boiling aromatic hydrocarbon, particularly xylene or a high boiling hydrocarbon solvent blend, for example 'Solvesso'.

The salification steps can be carried out by standard procedures for example by contacting the polymer containing free acid groups with a base, or the polymer containing free amino with an acid in a liquid medium in which the base or acid is soluble and the polymer is at least partially soluble.

The aromatic thiols specifically referred to above, the alcohols of formula (1), vinyl monomers of formula (3), acrylates and methacrylates of formula (4) are known, or can be made by analogy with known processes.

In use, the polymers of this invention are formulated with a volatile liquid diluant or carrier into coating compositions.

According to the present invention there is also provided a coating composition comprising a co-polymer having a hub portion from which radiate from 3 to 8 arms where the hub portion is the residue of a tri-functional to octa-functional thiol and each arm is an addition polymer comprising structural units and functional units that are mutually compatible, the functional units including crosslinking substituents capable of undergoing a crosslinking reaction with a crosslinking agent or a crosslinking substituent in functional units in another molecule of the same polymer and optionally compatible auxiliary functional units that contain wetting groups and a liquid diluant or carrier.

Examples of liquid carriers are aliphatic hydrocarbons, aromatic hydrocarbons, halogenated hydrocarbons, alcohols, ketones, esters, ethers alcohols and water.

The amount of the liquid carrier can be varied depending on the molecular weight or composition of the polymer so that the resulting composition is of an appropriate viscosity for the method of application chosen.

The compositions also comprise crosslinking agents. The crosslinking agent chosen in any particular case depends upon the functional units in the polymer.

Where the functional units in the co-polymer contain an hydroxyl group, the crosslinking agent can be a di- or multifunctional isocyanate, a melamine formaldehyde resin or a glycoluril. Glycolurils are also effective as cross-linking agents for polymers where the functional unit contains carboxyl groups.

Examples of simple di- and multifunctional isocyanates are alkane diisocyanates of formula (5):

$$OCN(CH_2)_nNCO \qquad (5)$$

where n is from 2 to 8. In particular n is 4 to 6 especially 6.

An example of a simple cycloalkanediisocyanate is isophoronediisocyanate.

Examples of simple aromatic di-isocyanates are toluene-2,4-diisocyanate and 4,4-diphenylmethane diisocyanate.

Complex multi-functional oligomeric isocyanates are reaction products of di- and polyols with the di-functional isocyanates described above.

Examples of diols and polyols are ethylene glycol, propyleneglycol, trimethylolpropane and pentaerythritol.

Optionally the composition also comprises a catalyst for the crosslinking reaction. For example the catalyst can be an organotin compound for example dibutyltin dilaurate.

These isocyanate crosslinkers are known or can be made by analogy with known methods. Many are available under the brand name 'Desmodur'.

Melamine formaldehyde resins are commercially available under the trade name 'Cymel'.

Where the functional units in the co-polymer contain isocyanate groups then the crosslinker can be a di- or multifunctional alcohol.

Examples of simple di- and multi-functional alcohols are ethylene glycol, propylene glycol, trimethylol propane and pentaerythritol.

Such compositions can also comprise a catalyst for the cross linking reaction. The catalyst can be an organotin compound for example dibutyltin dilaurate.

Glycolurils (also called acetylene ureas) and their preparation is described in U.S. Pat. No. 4,064,191. They are prepared by reacting two moles of urea with one mole of glyoxal. The glycoluril so obtained can optionally bear a $C_{1-6}$ alkyl substituent (this is introduced by selection of appropriate starting materials) or can be methylolated partially or fully by reaction with from 1 to 4 moles of formaldehyde.

Examples of glycolurils disclosed in U.S. Pat. No. 4,064,191 are tetramethylol glycoluril, tetrabutoxymethyl glycoluril, partially methylolated glycoluril, tetramethoxylmethyl glycoluril, and dimethyoxydiethoxy glycoluril. A particular group of glycoluril derivatives consists of mono- and dimethylether of dimethylol glycoluril, the trimethylether of tetramethylol glycoluril, the tetramethylether of tetramethylol glycoluril, tetrakisethoxymethyl glycoluril tetrakispropoxymethyl glycoluril, tetrakisbutoxymethyl glycoluril, tetrakisamyloxymethyl glycoluril and tetrakishexoxymethyl glycoluril. Another glycoluril is dimethylol dihydroxyl ethylene urea. Its chemical structure is thought to be as shown in formula (6).

$$
\begin{array}{c}
HO-CH_2 \\
\phantom{HO-CH_2}\diagdown \\
\phantom{HO-CH_2}N\phantom{xxxxxxx}C-OH \\
\phantom{HO-CH_2xx}| \phantom{xxxxxxxx} | \\
\phantom{HO-CH_2xx}H \phantom{xxxxxxxxx} \\
O=C \\
\phantom{O=}| \\
\phantom{HO-CH_2}N\phantom{xxxxxxx}C-OH \\
\phantom{HO-CH_2}\diagup \phantom{xxxxxxx} | \\
HO-CH_2 \phantom{xxxxxx} H
\end{array}
\qquad (6)
$$

The cross-linking reaction between the hydroxy polymer and the glycoluril can be catalysed by an acid catalyst for example toluene sulphonic acid.

Glycolurils are particularly useful as crosslinkers for water-borne coating compositions.

Where the functional unit contains an isocyanate group or epoxy group, the crosslinking agent is a simple mono-primary amine or a simple di- or multi-functional amine.

Examples of simple mono primary amines are $C_{2-8}$ alkyl amines, in particular ethylamine, propylamine, butylamine and hexylamine.

Examples of simple di-amines are amines of formula (7):

$$NH_2(CH_2)_mNH_2 \qquad (7)$$

where m is from 2 to 8, especially 4 to 6. A particular diamine is 1,6-diaminohexane.

Examples of complex diamines are amine-terminated polypropylene glycols of formula (8):

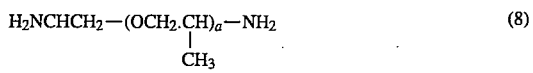

(8)

where a is from 2 to 6.

Examples of complex triamines are of general formula (9):

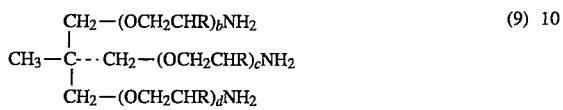

(9)

where R is hydrogen or $C_{1-6}$alkyl, for example methyl ethyl or propyl, and b, c and d are integers such that their sum is from 3 to 30.

Amines of formula (8) and (9) are commercially available under the trade mark 'Jeffamine'.

Where the functional units in the co-polymer contain allyl ester groups, crosslinking takes place by free radical polymerisation. The compositions can contain a free radical initiator. Examples of suitable free radical initiators are peroxides especially benzoyl peroxide.

Where the functional units in the co-polymer contain 2-hydroxy-3-allyloxypropyl ester groups, crosslinking takes place by autoxidation in air in the presence of a cobalt catalyst for example cobalt octoate or cobalt naphthenate.

Where the functional unit contains a carboxyl group, the crosslinking agent can be a di- or multifunctional epoxide.

Examples of polyepoxides include polyglycidylethers of polyphenols, especially those having an epoxide equivalent in the range 150 to 2500, and more especially in the range 400 to 1000. Particular examples of such polyepoxides are those derived from epichlorhydrin and bis(4-hydroxyphenyl)- 2,2-propane. These polyepoxides can be regarded as having the idealised structural formula (10):

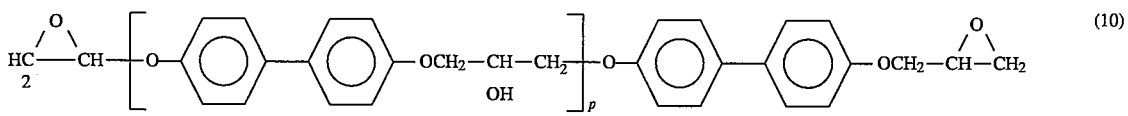

(10)

where p is an integer such that the polyepoxide has an epoxide equivalent within the above range.

Polyepoxides of this type are available under the Trade Mark 'Epikote' in particular Epikote 1001, 1004 and 1007.

In addition, the composition can also comprise optional additives, for example UV absorbers and water scavengers or flow aids commonly used in paint formulations to modify application or final film properties.

The compositions of the invention can be prepared by mixing a co-polymer of the invention with a liquid carrier and any other optional additive.

The compositions of this invention can be used to coat an object by applying a film to the surface of the object by standard techniques for example by dipping, brushing, roller coating or spraying, allowing the solvent to evaporate and the film to cure.

The invention is illustrated by the following Examples where Examples 1, 3 to 21 and 23, 25, 27 and 28 illustrate the invention and Examples 2, 22, 24, 26 and 29 are comparative.

EXAMPLES

The properties of each polymer are displayed in Table 3.

Examples 1 to 17 are examples of hydroxyl functional polymers.

EXAMPLE 1

Preparation of Polymer Dispersion 1

An initiator 'spike' comprising a mixture of tertiary butylperbenzoate (15.0 g), butyl acetate (7.5 g) and $C_{10}$ aromatic hydrocarbon solvent commercially available from Exxon as 'Solvesso' 100 (7.5 g), ('Solvesso' is a trade mark) was added over 10 minutes with stirring to butyl acetate (592.5 g) and 'Solvesso' 100 (592.5 g) in an inert atmosphere heated at reflux.

A second mixture of hydroxyethyl methacrylate (725.4 g), methyl methacrylate (729.2 g), butyl acrylate (345.4 g), tertiary butylperbenzoate (90.0 g) and pentaerythritol tetramercaptopropionate (36.0 g) was added over three hours to the solvent mixture heated at reflux.

The temperature was held at reflux for a further three hours.

Cooling the reaction product yielded Polymer 1 as a dispersion having a theoretical non volatile content of 60.0% which was diluted with butyl acetate (449.0 g) and filtered under pressure (15psi) through a filter bed of 'Celite 560' diatomaceous Silica, commercially available from Manville Corporation (Celite is a trade mark).

The molecular weight of the polymer was determined using the Gel Permeation Chromatography technique as described in Gel Chromatography; Theory, Methodology & Application, T Kremmer: L Boross, Wiley Interscience 1979.

Three 30 cm 'PL Gel' (a trade name of Polymer Laboratories) columns, $10^6$ A, $10^4$ A, and 500 A respectively, were arranged in series in order that the high molecular weight polymer particles would be eluted first and were calibrated with ten polystyrene standards in the molecular weight range 600 to $2.95 \times 10^6$ (available from Polymer Laboratories, Church Stretton, Shropshire) eluting with tetrahydrofuran at 1 $cm^3$ $min^{-1}$. After calibration an aliquot of polymer under test was placed on the first column in the series and eluted in the same way.

Preparation of Clearcoat Composition 1

A Clearcoat was prepared by mixing together the following components to give an activation ratio of 1:1 hydroxyl groups to isocyanate groups:

| | |
|---|---|
| 1. Polymer 1 Dispersion (52.5% solids). | 47.50 g |
| 2. An isocyanate trimer of hexamethylene diisocyanate, 90% solution in butyl acetate and 'Solvesso' 100 (1:1), commercially available from Bayer as Desmodur N3390' or from Rhone Poulenc as 'Tolonate HDT90'. | 16.74 g |
| 3. Butyl acetate. | 34.61 g |
| 4. A slip aid, 50% solution in xylene, commercially available from Bayer as | 0.15 g |

-continued

| | |
|---|---|
| 'Baysilone OL17'. | |
| 5. An anticrater agent, 50% solution in $C_{9-10}$ hydrocarbon, commercially available from BYK Chemie as 'BYK 358'. | 0.60 g |
| 6. A 10% solution of dibutyltin dilaurate in butyl acetate. | 0.40 g |

The resulting composition had a theoretical non volatile content of 40.0%.

EXAMPLES 2 TO 17

EXAMPLE 2

Preparation of Polymer Dispersion 2

A mixture of hydroxyethyl methacrylate (725.4 g), butyl acrylate (345.4 g), methyl methacrylate (729.2 g) and tertiary butylperbenzoate (72.0 g) was added over three hours with stirring to butyl acetate (600.0 g) and Solvesso 100 (600.0 g) in an inert atmosphere heated at reflux.

The temperature was held at reflux for a further three hours.

Preparation of Clearcoat Composition 2

This was prepared exactly as described for Clearcoat Composition 1 using the quantities of each component as set out in Table 2.

EXAMPLE 3

Preparation of Polymer Dispersion 3

A mixture of hydroxyethyl methacrylate (725.4 g), butyl acrylate (345.4 g), methyl methacrylate (729.2 g), pentaerythritol tetramercaptopropionate (36.0 g) and tertiary butylperbenzoate (90.0 g) was added over three hours with stirring to butyl acetate (600.0 g) and Solvesso 100 (600.0 g) in an inert atmosphere heated at reflux.

The temperature was held at reflux for a further three hours.

Preparation of Clearcoat Composition 3

This was prepared exactly as described for Clearcoat Composition 1 using the quantities of each component as set out in Table 2.

EXAMPLE 4

Preparation of Polymer Dispersion 4

A mixture of hydroxyethyl methacrylate (725.4 g), butyl acrylate (345.4 g), methyl methacrylate (729.2 g), pentaerythritol tetramercaptopropionate (72.0 g) and 2,2,azo-bis(2 methyl-butyronitrile) (126.0 g, commercially available from Dupont as Vazo 67) was added over three hours with stirring to butyl acetate (900.0 g) and Solvesso 100 (300.0 g) in an inert atmosphere heated at reflux.

The temperature was held at reflux for a further three hours.

The product so obtained (theoretical non volatile content of 60.0%) was filtered as described in Example 1.

Preparation of Clearcoat Composition 4

This was prepared exactly as described for Clearcoat Composition 1 using the quantities of each component as set out in Table 2.

EXAMPLE 5

Preparation of Polymer Dispersion 5

An initiator 'spike' comprising a mixture of tertiary butylperbenzoate (15.0 g), butyl acetate (7.5 g) and $C_{10}$ aromatic hydrocarbon solvent 'Solvesso' 100 (7.5 g) was added over 10 minutes with stirring to butyl acetate (592.5 g) and 'Solvesso' 100 (592.5 g) in an inert atmosphere heated at reflux.

A second mixture of hydroxyethyl methacrylate (468.0 g), methyl methacrylate (924.4 g), butyl acrylate (407.6 g), tertiary butylperbenzoate (90.0 g) and pentaerythritol tetramercaptopropionate (36.0 g) was added over three hours to the solvent mixture heated at reflux.

The temperature was held at reflux for a further three hours.

The product so obtained (theoretical non volatile content of 60.0%) was filtered as described in Example 1.

Preparation of Clearcoat Composition 5

This was prepared exactly as described for Clearcoat Composition 1 using the quantities of each component as set out in Table 2.

EXAMPLE 6

Preparation of Polymer Dispersion 6

An initiator 'spike' comprising a mixture of tertiary butylperbenzoate (15.0 g), butyl acetate (7.5 g) and $C_{10}$ aromatic hydrocarbon solvent 'Solvesso' 100 (7.5 g) was added over 5 minutes with stirring to butyl acetate (592.5 g) and 'Solvesso' 100 (592.5 g) in an inert atmosphere heated at reflux.

A second mixture of hydroxyethyl methacrylate (468.0 g), methyl methacrylate (1100.4 g), butyl acrylate (231.6 g), tertiary butylperbenzoate (90.0 g) and pentaerythritol tetramercaptopropionate (36.0 g) was added over three hours to the solvent mixture heated at reflux.

The temperature was held at reflux for a further three hours.

The product so obtained (theoretical non volatile content of 60.0%) was thinned with butyl acetate (463.1 g) and filtered as described in Example 1.

Preparation of Clearcoat Composition 6

This was prepared exactly as described for Clearcoat Composition 1 using the quantities of each component as set out in Table 2.

EXAMPLE 7

Preparation of Polymer Dispersion 7

A mixture of hydroxyethyl methacrylate (725.4 g), butyl acrylate (723.6 g), methyl methacrylate (351.0 g), pentaerythritol tetramercaptopropionate (36.0 g) and tertiary butylperbenzoate (126.0 g) was added over three hours with stirring to butyl acetate (600.0 g) and Solvesso 100 (600.0 g) in an inert atmosphere heated at reflux.

The temperature was held at reflux for a further three hours.

The product so obtained (theoretical non volatile content of 60.0%) was thinned with butyl acetate (3162.0 g) and filtered as described in Example 1.

Preparation of clearcoat composition 7

This was prepared exactly as described for Clearcoat Composition 1. using the quantities of each component as set out in Table 2.

EXAMPLE 8

Preparation of Polymer Dispersion 8

An initiator 'spike' comprising a mixture of tertiary butylperbenzoate (15.1 g) and methyl propoxol acetate (15.1 g) was added over 5 minutes with stirring to methyl propoxol acetate (1184.9 g) in an inert atmosphere heated at reflux.

A second mixture of hydroxyethyl methacrylate (936.1 g), methyl methacrylate (182.2 g), butyl acrylate (681.7 g), tertiary butylperbenzoate (90.2 g) and pentaerythritol tetramercaptopropionate (36.1 g) was added over three hours to the solvent mixture heated at reflux. The temperature was held at reflux for a further three hours.

The product so obtained was filtered under pressure (15psi) through a filter bed of 'Celite 560'.

Preparation of Clearcoat Composition 8a

This was prepared exactly as described for Clearcoat Composition 1 using the quantities of each component as set out in Table 2.

Preparation of Clearcoat Compositions 8b and 8c

Clearcoat Compositions 8a and 8b were prepared by mixing together the amounts of components as shown in Table 1 to give an activation ratio of hydroxyl groups to isocyanate groups of 1:1.
(Figures are weight in grams).

TABLE 1

Formulations for Clearcoat Compositions 8b and 8c

| COMPONENTS | COMPOSITION | |
|---|---|---|
| | 8b | 8c |
| 1. Polymer Dispersion 8. | 47.54 | 52.54 |
| 2. Lumiflon resin 926Z commercially available from Imperial Chemical Industries PLC, (5.0 g). | 5.00 | 0.00 |
| 3. UV absorber/light stabiliser, hindered amine/oxanilide, 30% solution in xylene commercially available from Sandoz AG as 'Sanduvor 2312'. | 6.00 | 6.00 |
| 4. A 0.5% solution of dibutyltin dilaurate in xylene. | 1.00 | 1.00 |
| 5. A slip aid, 50% solution in xylene commercially available from Bayer as 'Baysilone OL17'. | 0.10 | 0.10 |
| 6. An anticrater agent, 50% solution in C$_{9-10}$ hydrocarbon, commercially available from BYK Chemie as 'BYK 358'. | 0.70 | 0.70 |
| 7. Methyl ethyl ketone. | 16.44 | 16.44 |
| 8. Butyl ethoxol acetate. | 5.59 | 5.59 |
| 9. Butyl acetate. | 2.04 | 2.04 |

TABLE 1-continued

Formulations for Clearcoat Compositions 8b and 8c

| COMPONENTS | COMPOSITION | |
|---|---|---|
| | 8b | 8c |
| 10. Methyl propoxol acetate. | 37.09 | 37.09 |
| 11. An isocyanate trimer of hexamethylene diisocyanate, 90% solution in butyl acetate and 'Solvesso' 100 (1:1), commercially available from Bayer as 'Desmodur N3390'. | 32.39 | 32.39 |

EXAMPLE 9

Preparation of Polymer Dispersion 9

A mixture of hydroxyethyl methacrylate (725.4 g), butyl acrylate (723.6 g), methyl methacrylate (351.0 g), dipentaerythritol hexamercaptopropionate (19.5 g) and tertiary butylperbenzoate (36.0 g) was added over three hours with stirring to butyl acetate (600.0 g) and Solvesso 100 (600.0 g) in an inert atmosphere heated at reflux.

The temperature was held at reflux for a further three hours.

The product so obtained was diluted with butyl acetate (2350.0 g) and filtered as described in Example 1.

Preparation of Clearcoat Composition 9

This was prepared exactly as described for Clearcoat Composition 1 using the quantities of each component as set out in Table 2.

EXAMPLE 10

Preparation of Polymer Dispersion 10

An initiator 'spike' comprising a mixture of tertiary butylperbenzoate (15.23 g) and methyl propoxol acetate (15.23 g) was added over 5 minutes with stirring to methyl propoxol acetate (1185.05 g) in an inert atmosphere heated at reflux.

A second mixture of hydroxyethyl methacrylate (836.0 g), glycidyl methacrylate (90.1 g), methyl methacrylate (195.4 g), butyl acrylate (678.3 g), tertiary butylperbenzoate (90.1 g) and pentaerythritol tetramercaptopropionate (35.85 g) was added over three hours to the solvent mixture heated at reflux. The temperature was held at reflux for a further one hour.

Para aminobenzoic acid (27.0 g), followed by tertiary N,N dimethyl-N-alkylamine (4.4 g) were added-to the refluxing mixture. The temperature was held at reflux for a further 90 minutes.

The product so obtained was filtered as described in Example 1.

EXAMPLE 11

Preparation of Polymer Dispersion 11

A mixture of hydroxyethyl methacrylate (40.3 g), butyl acrylate (40.2 g), methyl methacrylate (19.5 g), tertiary butylperbenzoate (2.0 g) and pentaerythritol tetramercaptopropionate (1.0 g) was added over three hours with stirring to butyl acetate (33.3 g) and Solvesso 100 (33.3 g) in an inert atmosphere heated at reflux.

The temperature was held at reflux for a further three hours.

The product so obtained (theoretical non volatile content of 60.0%) was diluted with butyl acetate (51.4 g) and filtered as described in Example 1.

Preparation of Clearcoat Composition 11

This was prepared exactly as described for Clearcoat Composition 1 using the quantities of each component as set out in Table 2.

EXAMPLE 12

Preparation of Polymer Dispersion 12

A mixture of hydroxyethyl methacrylate (40.3 g), butyl acrylate (40.2 g), methyl methacrylate (19.5 g), tertiary butylperbenzoate (6.0 g) and pentaerythritol tetramercaptopropionate (1.0 g) was added over three hours with stirring to butyl acetate (33.3 g) and Solvesso 100 (33.3 g) in an inert atmosphere heated at reflux.

The temperature was held at reflux for a further three hours.

Preparation of clearcoat composition 12

This was prepared exactly as described for Clearcoat Composition 1 using the quantities of each component as set out in Table 2.

EXAMPLE 13

Preparation of Polymer Dispersion 13

A mixture of hydroxyethyl methacrylate (40.3 g), butyl acrylate (40.2 g), methyl methacrylate (19.5 g), tertiary butylperbenzoate (6.0 g) and pentaerythritol tetramercaptopropionate (3.0 g) was added over three hours with stirring to butyl acetate (33.3 g) and Solvesso 100 (33.3 g) in an inert atmosphere heated at reflux.

The temperature was held at reflux for a further three hours.

Preparation of Clearcoat Composition 13

This was prepared exactly as described for Clearcoat Composition i using the quantities of each component as set out in Table 2.

EXAMPLE 14

Preparation of Polymer Dispersion 14

An initiator 'spike' comprising a mixture of tertiary butylperbenzoate (15.0 g), butyl acetate (7.5 g) and $C_{10}$ aromatic hydrocarbon solvent 'Solvesso' 100 (7.5 g) was added over 10 minutes with stirring to butyl acetate (592.5 g) and 'Solvesso' 100 (592.5 g) in an inert atmosphere heated at reflux.

A second mixture of hydroxyethyl methacrylate (234.0 g), methyl methacrylate (1110.2 g), butyl acrylate (455.8 g), tertiary butylperbenzoate (90.0 g) and pentaerythritol tetramercaptopropionate (36.0 g) was added over three hours to the solvent mixture heated at reflux.

The temperature was held at reflux for a further three hours.

The product so obtained was filtered as described in Example 1.

Preparation of Clearcoat composition 14

This was prepared exactly as described for Clearcoat Composition 1 using the quantities of each component as set out in Table 2.

EXAMPLE 15

Preparation of Polymer Dispersion 15

An initiator 'spike' comprising a mixture of tertiary butylperbenzoate (15.0 g), butyl acetate (7.5 g) and $C_{10}$ aromatic hydrocarbon solvent 'Solvesso' 100 (7.5 g) was added over 10 minutes with stirring to butyl acetate (592.5 g) and 'Solvesso' 100 (592.5 g) in an inert atmosphere heated at reflux.

A second mixture of hydroxyethyl methacrylate (351.0 g), methyl methacrylate (1017.0 g), butyl acrylate (432.0 g), tertiary butylperbenzoate (90.0 g) and pentaerythritol tetramercaptopropionate (36.0 g) was added over three hours to the solvent mixture heated at reflux.

The temperature was held at reflux for a further three hours.

The product so obtained was thinned with butyl acetate (666.0 g) and filtered as described in Example 1.

Preparation of Clearcoat composition 15

This was prepared exactly as described for Clearcoat Composition 1 using the quantities of each component as set out in Table 2.

EXAMPLE 16

Preparation of Polymer Dispersion 16

An initiator 'spike' comprising a mixture of tertiary butylperbenzoate (15.0 g), butyl acetate (7.5 g) and $C_{10}$ aromatic hydrocarbon solvent 'Solvesso' 100 (7.5 g) was added over 10 minutes with stirring to butyl acetate (592.5 g) and 'Solvesso' 100 (592.5 g) in an inert atmosphere heated at reflux.

A second mixture of hydroxyethyl methacrylate (585.0 g), methyl methacrylate (831.0 g), butyl acrylate (384.0 g), tertiary butylperbenzoate. (90.0 g) and pentaerythritol tetramercaptopropionate (36.0 g) was added over three hours to the solvent mixture heated at reflux.

The temperature was held at reflux for a further three hours.

The product so obtained was thinned with butyl acetate (401.0 g) filtered as described in Example 1.

Preparation of Clearcoat Composition 16

This was prepared exactly as described for Clearcoat Composition 1 using the quantities of each component as set out in Table 2.

EXAMPLE 17

Preparation of Polymer Dispersion 17

A mixture of hydroxyethyl methacrylate (40.3 g), butyl acrylate (40.2 g), methyl methacrylate (19.5 g), tertiary butylperbenzoate (6.0 g) and pentaerythritol tetramercaptopropionate (1.0 g) was added over three hours with stirring to butyl acetate (33.3 g) and Solvesso 100 (33.3 g) in an inert atmosphere heated at reflux.

The temperature was held at reflux for a further three hours.

The product so obtained (theoretical non volatile content of 60.0%) was diluted with butyl acetate (177.0 g) and filtered as described in Example 1.

Preparation of clearcoat composition 17

This was prepared exactly as described for Clearcoat Composition 1 using the quantities of each component as set out in Table 2.

EXAMPLE 18

Preparation of Polymer 18

An Example of a carboxy functional polymer.

A mixture of ethyl acrylate (506.8 g), methyl methacrylate (506.8 g), acrylic acid (438.7 g), tertiary butyl-per-2-ethyl hexanoate (36.3 g) and pentaerythritol tetramercaptopropionate (36.3 g) was added over three hours with stirring to propylene glycol methyl ether (969.0 g) heated at reflux.

After 15 minutes tertiary butyl-per-2-ethyl hexanoate (1.69 g) was added to the mixture. A similar addition was made after 10 minutes. A further four additions at intervals of 10 minutes were made to the mixture heated at reflux.

The temperature was held at reflux for a further 15 minutes.

EXAMPLE 19

Preparation of Polymer Dispersion 19

An Example of an epoxy functional polymer.

A mixture of glycidyl methacrylate (396.18 g), methyl methacrylate (1008.18 g), butyl acrylate (395.64 g), tertiary butyl perbenzoate (90.0 g) and pentaerythritol tetramercaptopropionate (36.0 g) was added over three hours with stirring to butyl acetate (600.0 g) and $C_{10}$ aromatic hydrocarbon solvent 'Solvesso' 100 (600.0 g) heated at reflux.

The temperature was held at reflux for three hours.

EXAMPLE 20

Preparation of Polymer Dispersion 20

An Example of an allyl functional polymer.

A mixture of ethyl acrylate (506.8 g), methyl methacrylate (506.8 g), acrylic acid (438.7 g), tertiary butyl per-2-ethylhexanoate (25.34 g) and pentaerythritol tetra mercaptopropionate (25.34 g) was added over three hours with stirring to 1-methoxy-2-hydroxy propane (969.0 g) heated at reflux.

After 15 minutes, tertiary butyl per-2-ethylhexanoate (1.69 g) was added to the mixture. A similar addition was made after 10 minutes. A further four additions at intervals of 10 minutes were made to the mixture heated at reflux.

The temperature was held at reflux for a further 15 minutes then reduced to 70° C.

A mixture of allyl glycidyl ether (578.7 g) and benzyl trimethyl ammonium hydroxide (8.68 g) was added to the cooled solution. The temperature of the mixture was then raised to reflux and maintained for five hours.

EXAMPLE 21

Preparation of Polymer Dispersion 21

An example of an allyl functional polymer.

A mixture of ethyl acrylate (16.37 parts), methyl methacrylate (16.37 parts), acrylic acid (14.17 parts), tertiary butyl per-2-ethylhexanoate (1.17 parts) and pentaerythritol tetra mercaptopropionate (1.17 parts) was added over three hours with stirring to 1-methoxy-2-hydroxy propane (31.30 parts) heated at reflux.

After 5 minutes, tertiary butyl per-2-ethylhexanoate (0.08 parts) was added to the mixture. A similar addition was made after 10 minutes. A further four additions at intervals of 10 minutes were made to the mixture heated at reflux.

The temperature was held at reflux for a further 15 minutes then reduced to 70° C.

Allyl glycidyl ether (18.69 parts) followed by benzyl trimethyl ammonium hydroxide (an oxirane-ring opening catalyst, 0.29 parts) was added to the cooled solution. The temperature of the mixture was then raised to reflux and maintained for five hours, or until the Epoxy value<5mg KOH/g Non Volatile material.

The final product had a viscosity of 33 seconds as measured using a bubble tube at a temperature of 25° C. and a non volatile content of 65.0%.

EXAMPLE 22

Preparation of Polymer Dispersion 22

An example of a linear allyl functional polymer.

A mixture of ethyl acrylate (16.39 parts), methyl methacrylate (16.39 parts), acrylic acid (14.19 parts) and tertiary butyl per-2-ethylhexanoate (2.35 parts) was added over three hours and thirty minutes with stirring to 1-methoxy-2-hydroxy propane (28.38 parts) heated at reflux.

After 15 minutes a mixture of tertiary butyl per-2-ethylhexanoate (0.47 parts) and 1-methoxy-2hydroxy propane (3.01 parts) was added over 15 minutes to the above mixture heated at reflux.

The temperature was maintained at reflux for a further 1 hour then reduced to 112° C.

Allyl glycidyl ether (18.53 parts), followed by benzyl trimethyl ammonium hydroxide (0.28 parts) and 1-methoxy-2-hydroxy propane (0.44 parts) were added to the cooled solution. The temperature of the mixture was then raised to reflux and maintained for five hours, or until the Epoxy value< 5mg KOH/g Non Volatile material.

The final product had a viscosity of 28 seconds as measured using a bubble tube at a temperature of 25° C. and a non volatile content of 65.6%.

EXAMPLE 23

Preparation of Polymer Dispersion 23

A mixture of hydroxy ethyl acrylate (445.4 g) and ethyl acrylate (190.9 g) was fed over a period of three hours concurrently with a mixture of tertiary butyl per-2-ethylhexanoate (10.09 g), pentaerythritol tetra mercaptopropionate (12.72 g) and 1-methoxy-2-hydroxy propane (1.1 g) with stirring to a mixture of 1-methoxy-2-hydroxy propane (197.2 g) and demineralised water (131.9 g) heated at reflux.

After 15 minutes, tertiary butyl perbenzoate (6.4 g) was added over a period of 50 minutes to the mixture heated at reflux.

The temperature was maintained for a further 20 minutes.

The resulting product had a viscosity of 9.0 seconds as measured using a bubble tube at a temperature of 25° C. and a non volatile content of 60.0%.

Preparation of Clearcoat Composition 23

A clearcoat was prepared by blending together the following components. The composition was then acidified to a pH of 1.0 using toluene sulphonic acid solution (25% in water).

| 1. Polymer Dispersion 23 | 30.00 g |
|---|---|
| 2. Tetramethylol glycoluril solution (45% in water) (Commercially available from Dyno-Cyanamid as 'Cymel 1172') | 12.51 g |
| 3. Water | 12.54 g |

EXAMPLE 24

Preparation of Polymer Dispersion 24

A mixture of hydroxy ethyl acrylate (445.4 g) and ethyl acrylate (190.9 g) was fed over a period of three hours concurrently with tertiary butyl per-2-ethylhexanoate (31.8 g) with stirring to a mixture of 1-methoxy-2-hydroxy propane (197.2 g) and demineralised water (131.9 g) heated at reflux.

After 15 minutes, tertiary butyl perbenzoate (6.36 g) was added over a period of 50 minutes to the mixture heated at reflux.

The temperature was maintained for a further 15 minutes.

The final product had a viscosity of 8.0 seconds as measured using a bubble tube at a temperature of 25° C. and a non volatile content of 60.0%.

Preparation of Clearcoat Composition 24

A clearcoat was prepared by blending together the following components. The composition was then acidified to a pH of 1.0 using toluene sulphonic acid solution (25% in water).

| 1. Polymer Dispersion 24 | 30.04 g |
|---|---|
| 2. Tetramethylol glycoluril solution (45% in water) (Commercially available from Dyno-Cyanamid as 'Cymel 1172') | 12.16 g |
| 3. Water | 13.96 g |

Table 2 shows the quantities of each component, required to prepare Clearcoat compositions 1 to 7, 8a, 9 and 11 to 17.

TABLE 2

Formulations for Clearcoat Compositions 1 to 7, 8a, 9 and 11 to 17

| CLEARCOAT COMPOSITION | POL. No. | DISP'N (g) | STARTING MATERIALS: | | | | |
|---|---|---|---|---|---|---|---|
| | | | 2. | 3. | 4. | 5. | 6. |
| 1 | 1 | 47.50 | 16.74 | 34.61 | 0.15 | 0.60 | 0.40 |
| 2 | 2 | 39.81 | 16.74 | 42.30 | 0.15 | 0.60 | 0.40 |
| 3 | 3 | 38.36 | 16.74 | 43.75 | 0.15 | 0.60 | 0.40 |
| 4 | 4 | 41.63 | 16.74 | 40.48 | 0.15 | 0.60 | 0.40 |
| 5 | 5 | 55.04 | 12.47 | 31.34 | 0.15 | 0.60 | 0.40 |
| 6 | 6 | 55.04 | 12.47 | 31.34 | 0.15 | 0.60 | 0.40 |
| 7 | 7 | 42.99 | 16.74 | 39.12 | 0.15 | 0.60 | 0.40 |
| 8a | 8 | 35.79 | 19.47 | 43.59 | 0.15 | 0.60 | 0.40 |
| 9 | 9 | 41.95 | 16.74 | 40.16 | 0.15 | 0.60 | 0.40 |
| 11 | 11 | 52.98 | 16.60 | 8.64 | 0.15 | 0.60 | 0.40 |
| 12 | 12 | 40.24 | 16.60 | 41.97 | 0.15 | 0.60 | 0.40 |
| 13 | 13 | 40.30 | 16.60 | 41.91 | 0.15 | 0.60 | 0.40 |
| 14 | 14 | 56.30 | 7.2 | 35.50 | 0.60 | — | 0.40 |
| 15 | 15 | 62.10 | 10.0 | 26.90 | 0.60 | — | 0.40 |
| 16 | 16 | 50.2 | 14.4 | 43.30 | 0.60 | | 0.40 |
| 17 | 17 | 76.47 | 16.6 | 6.38 | 0.15 | — | 0.40 | where the starting materials are:-
2. An isocyanate trimer of hexamethylene diisocyanate, 90% solution in butyl acetate and 'Solvesso' 100 (1:1), commercially available from Bayer as Desmodur N3390' or from Rhone Poulenc as 'Tolonate HDT90'.
3. Butyl acetate.
4. A slip aid, 50% solution in xylene, commercially available from Bayer as 'Baysilone OL17'.
5. An anticrater agent, 50% solution in $C_{9-10}$ hydrocarbon, commercially available from BYK Chemie as 'BYK 358'.
6. A 10% solution of dibutyltin dilaurate in butyl acetate.

The properties of Polymer Dispersions 1 to 24 are shown in Table 3 below:

TABLE 3

Properties of Polymer Dispersions 1 to 24

| POLYMER DISP'N | FUNCTIONAL GROUP | FUNCTIONALITY (%) | NON VOL (%) | Tg (°C.) | MOLECULAR WEIGHT (Mw) |
|---|---|---|---|---|---|
| 1 | Hydroxyl | 35.80 | 52.50 | 41 | 7,092 |
| 2 | " | 35.80 | 62.64 | 41 | 6,774 |
| 3 | " | 35.80 | 65.00 | 41 | 14,061 |
| 4 | " | 35.80 | 59.00 | 41 | 3,770 |
| 5 | " | 22.46 | 61.50 | 40 | 9,006 |
| 6 | " | 21.93 | 52.30 | 60 | 8,641 |
| 7 | " | 37.86 | 58.00 | 5 | 8,366 |
| 8 | " | 50.18 | 62.80 | 5 | 7,446 |
| 9 | " | 37.86 | 34.35 | 5 | 13,807 |
| 10 | " | 42.94 | 61.10 | 5 | 9,921 |
| | WG | 1.36 | | | |
| 11 | " | 37.85 | 46.60 | 5 | 15,285 |
| 12 | " | 37.85 | 61.40 | 5 | 8,013 |
| 13 | " | 37.85 | 61.40 | 5 | 9,705 |

TABLE 3-continued

Properties of Polymer Dispersions 1 to 24

| POLYMER DISP'N | FUNCTIONAL GROUP | FUNCTIONALITY (%) | NON VOL (%) | Tg (°C.) | MOLECULAR WEIGHT (Mw) |
|---|---|---|---|---|---|
| 14 | " | 10.93 | 59.10 | 40 | 9,089 |
| 15 | " | 16.62 | 49.50 | 40 | 6,382 |
| 16 | " | 28.46 | 53.20 | 40 | 9,515 |
| 17 | " | 37.85 | 52.80 | 5 | 7,453 |
| 18 | Carboxyl | 31.23 | 60.00 | 48 | 27,769 |
| 19 | Epoxy | 17.48 | 60.00 | 41 | 7,349 |
| 20 | Allyl Carboxyl | 23.83 4.77 | 67.70 | | 17,387 |
| 21 | Allyl Carboxyl | 23.82 4.78 | 65.00 | | 27,377 |
| 22 | Allyl Carboxyl | 23.64 5.03 | 65.60 | | 14,164 |
| 23 | Hydroxy | 66.79 | 66.20 | | 11,923 |
| 24 | Hydroxy | 66.79 | 65.60 | | 7,232 | where WG means wetting groups.

FUNCTIONALITY is expressed as the mole percentage of functional group-containing monomers as a percentage of total monomers (excluding thiol hub portion) making up the total polymer.

MOLECULAR WEIGHT is expressed as the apparent weight average molecular weight of the polymer.

EXAMPLE 25

Preparation of Primer composition 25

(a) Preparation of Pigment Millbase

Polymer 6 (1146.9 g) was charged to a premix vessel containing butyl acetate (540.9 g) and xylene (545.6 g). A mixture of Bentone 34 (25.0 g; commercially available from Steetley-Berk Ltd.), synthetic barium sulphate (681.0 g), aluminum/magnesium silicates (428.5 g), yellow iron oxide (77.5 g), zinc/aluminium phosphate (428.5 g), titanium dioxide (474.5 g) and magnesium silicate (599.0 g) was added to the premix vessel. The mixture was stirred and passed through an EIGER bead mill running at 3000 rpm until a fineness of 25 microns was achieved.

(b) Preparation of Hardener

To a mixture of methyl propoxol acetate (20.0 g), butyl acetate (10.0 g) and 'Solvesso' 100 (20.0 g), an isocyanate trimer of hexamethylene diisocyanate, 90% solution in butyl acetate and 'Solvesso' 100 (1:1), (48.0 g; commercially available from Rhone Poulenc as 'Tolonate HDT90') and triethyl ortho formate (2.0 g) were added and the mixture stirred together.

c) Preparation of Primer Composition

The following components were mixed together to give an activation ratio of 1:1 hydroxyl groups to isocyanate groups:

| | |
|---|---|
| 1. Pigment Millbase as described in (a) | 98.30 g |
| 2. Hardener as described in (b) | 25.00 g |
| 3. Triethyl ortho formate | 0.86 g |
| 4. Dibutyltin dilaurate | 0.07 g |
| 5. Calcium salt toluene sulphonic acid | 0.43 g |
| 6. 3-methacryloxypropyltrimethoxy-silane | 0.34 g |
| 7. Butyl acetate | 20.00 g |
| 8. Methyl propoxol acetate | ·3.75 g |
| 9. 'Solvesso' 100 | 1.25 g |

This gave a product with a viscosity of 18.3 seconds in a British Standard B4 viscosity cup at 23° C. and a pot life of 120 minutes. Where the pot life is measured to be the time for the viscosity to double.

EXAMPLE 26

Primer Composition 26

Example 26 is a comparative Example based upon a commercially available 2 component primer coating based on linear polymers. The composition is called '2K Extrafiller P565–761' and is available from Imperial Chemical Industries PLC. It has a viscosity of 19.7 seconds in a British Standard B4 viscosity cup at 23° C. and a pot life of 60 minutes. Pot life means the time for the viscosity to double.

EXAMPLE 27

Preparation of Coating Composition 27

(a) Preparation of Pigment Millbase

Polymer 10 (115.68 g) was charged to a premix vessel containing methyl propoxol acetate (58.48 g). A mixture of hostaperm violet RL (4.8 g), heliogen blue L7101F (3.84 g), carbon black (3.2 g), titanium dioxide (14.64 g) and monastral green GNC (0.96 g) was added to the premix vessel and mixed at 3500rpm for 20 minutes.

The mixture was passed through a NETZSCH bead mill until a fineness of 5 microns was achieved.

(b) Preparation of Coating Composition

The following components were mixed together to give an activation ratio of 1:1 hydroxyl groups : isocyanate groups:

| | |
|---|---|
| 1. Polymer 8 | 60.40 g |

-continued

| | |
|---|---|
| 2. Lumiflon resin 926X commercially available from Imperial Chemical Industries PLC. | 5.0 g |
| 3. Pigment millbase as described in (a). | 25.2 g |
| 4. Light stabiliser, hindered amine commercially available from Ciba Geigy SA as 'Tinuvin 292'. | 0.2 g |
| 5. UV absorber / Light stabiliser, benzotriazole derived product commercially available from Ciba Geigy SA as 'Tinuvin 900'. | 1.0 g |
| 6. A 0.5% solution of dibutyl tin dilaurate in xylene. | 1.5 g |
| 7. A slip aid, 50% solution in xylene commercially available from Bayer as 'Baysilone OL17. | 0.1 g |
| 8. An anticrater agent, 50% solution in $C_{9-10}$ hydrocarbon, commercially available from BYK Chemie as 'BYK 358'. | 0.3 g |
| 9. Methyl isobutyl ketone. | 17.0 g |
| 10. An isocyanurate trimer of hexamethylene diisocyanate, 90% solution in butyl acetate, commercially available from Bayer as 'Desmodur N3390'. | 26.2 g |
| 11. A bioret of hexamethylene diisocyanate, 75% solution in methyl propoxol acetate and xylene (1:1), commercially available from Bayer as 'Desmodur N75'. | 13.1 g |

This gave a product with a viscosity of 29 seconds in a British Standard B3 viscosity cup at 25° C. and a pot life of 240 minutes. Pot life means the time for the viscosity to double.

EXAMPLE 28

Preparation of coating composition 28

The following components were mixed together to give an activation ratio of 1:1 hydroxyl groups : isocyanate groups:

| | |
|---|---|
| 1. Polymer 8. | 65.4 g |
| 2. Pigment millbase as described in (a). | 25.2 g |
| 3. Light stabiliser, hindered amine commercially available from Ciba Geigy SA as 'Tinuvin 292'. | 0.2 g |
| 4. UV absorber/Light stabiliser, benzotriazole derived product commercially available from Ciba Geigy SA as 'Tinuvin 900'. | 1.0 g |
| 5. A 0.5% solution of dibutyltin dilaurate in xylene. | 1.5 g |
| 6. A slip aid, 50% solution in xylene commercially available from Bayer as 'Baysilone OL17. | 0.1 g |
| 7. An anticrater agent, 50% solution in $C_{9-10}$ hydrocarbon, commercially available from BYK Chemie as 'BYK 358'. | 0.3 g |
| 8. Methyl isobutyl ketone. | 17.0 g |
| 9. An isocyanurate trimer of hexamethylene diisocyanate, 90% solution in butyl acetate, commercially available from Bayer as 'Desmodur N3390'. | 26.2 g |
| 10. An bioret of hexamethylene diisocyanate, 75% solution in methyl propoxol acetate and xylene (1:1), commercially available from Bayer as 'Desmodur N75'. | 13.1 g |

EXAMPLE 29

Preparation of Coating Composition 29

This is a commercially available two component polyurethane gloss finish based on a linear polymer available from Imperial Chemical Industries PLC as F407-701 and F210-731.

The composition is prepared by mixing together F407-701 (2 parts by volume) with F210-731 (1 part by volume) and methyl isobutyl ketone (1 part by volume) to give a product having a viscosity of 29 seconds in a British Standard B3 viscosity cup at 25° C. and a pot life of 360 minutes. Pot life means the time for the viscosity to double.

POT LIFE AND GEL TIME MEASUREMENTS

Pot Life

The pot life of Clearcoat Compositions 1 to 7, 8a and 9 was measured in minutes and means the time for the viscosity of the clearcoat (as measured using a BSB4 viscosity cup) when first prepared (activated with isocyanate) to double.

Gel Time

The gel time of Clearcoat Compositions 1 to 7, 8a and 9 was measured in minutes and means the time for the clearcoat to become immobile.

Table 4 below shows the initial viscosity (when first activated) as measured in a British Standard B4 viscosity cup at 22° C. of each clearcoat composition, the time in minutes for it to double (Pot Life) and the time in minutes for the clearcoat to become immobile (Gel Time).

TABLE 4

Pot Life and Gel Time of Clearcoat Compositions 1 to 9

| CLEARCOAT COMPOSITION | POLYMER TYPE | VISCOSITY BSB4 (22° C.) (SECS) | POT LIFE (MINS) | GEL TIME (MINS) |
|---|---|---|---|---|
| 1 | 4 arm Star/Med M. Wt./ Med OH Func./Med Tg | 17.3 | 225 | 270 |
| 2 | Linear/Med M. Wt./ Med OH Func./Med Tg | 21.3 | 60 | 90 |

TABLE 4-continued

Pot Life and Gel Time of Clearcoat Compositions 1 to 9

| CLEARCOAT COMPOSITION | POLYMER TYPE | VISCOSITY BSB4 (22° C.) (SECS) | POT LIFE (MINS) | GEL TIME (MINS) |
|---|---|---|---|---|
| 3 | 4 arm Star/High M. Wt./ Med OH Func./ Med Tg | 24.8 | 40 | 60 |
| 4 | 4 arm Star/Low M. Wt./ Med OH Func./Med Tg | 16.5 | 90 | 120 |
| 5 | 4 arm Star/Med M. Wt./ Low OH Func./Med Tg | 22.2 | 180 | 355 |
| 6 | 4 arm Star/Med M. Wt./ Low OH Func./High Tg | 21.0 | 210 | 385 |
| 7 | 4 arm Star/Med M. Wt./ Med OH Func./Low Tg | 16.6 | 210 | 255 |
| 8a | 4 arm Star/Med M. Wt./ High OH Func./Low Tg | 16.2 | 90 | 125 |
| 9 | 6 arm Star/High M. Wt./ Med OH Func./Low Tg | 19.6 | 130 | 180 |

It can be seen from Table 4 that Clearcoat Composition 1 containing a star polymer exhibits a lower viscosity and longer pot life than the equivalent composition containing a linear polymer (Clearcoat Composition 2).

WATER RESISTANCE TEST

Clearcoat Compositions 23 and 24 were tested for their resistance to water using the following method:

A coating 50 to 60 microns thick was applied at 20° C. and 50% relative humidity to a dry coat of conventional liquid gloss alkyd paint (such as "Dulux" brilliant white liquid gloss) after the coat had been allowed to dry at 20° C. and 50% relative humidity for at least 7 days. The coating was allowed to dry for 24 hours at 20° C. and 50% relative humidity. Then a 1 ml drop of water was deposited onto it and covered with a watch glass and allowed to stand at 20° C. for two hours. The glass was removed and the sample immediately wiped dry and examined for disfiguration at 24 hours and one week after spreading.

Table 5 below shows the water resistance of Clearcoat Compositions 23 and 24.

TABLE 5

Water Resistance of Clearcoat Compositions 23 and 24

| CLEARCOAT COMPOSITION | WATER RESISTANCE | |
|---|---|---|
| | 24 HOURS | 1 WEEK |
| 23 | Clear | Clear |
| 24 | Blisters Present | Clear |

It can be seen from Table 5 that Clearcoat Composition 23 which is based upon a Star polymer gives better early resistance to water than the equivalent Clearcoat composition based upon a linear polymer (24).

APPLICATION AND TESTING OF THE COATING COMPOSITIONS

Application

Primer Compositions 25 and 26 are suitable for use as an undercoat for re-spraying motor vehicles. The compositions were sprayed over bare steel substrates to a dry film thickness of 75–100 microns.

Coating Compositions 27 and 29 are suitable for use as coatings for aircraft. The compositions were sprayed over aluminium 20 SWG substrate coated with a standard chromate-containing epoxy primer, (commercially available from Imperial Chemical Industries PLC as F580-2080) to a dry film thickness of 15 microns.

Tests for Primer Compositions 25 and 26

Wet Sanding: The coated substrate is sanded with P800 grade wet or dry paper (commercially available from 3M) in the presence of water at 60 minutes after application of the coating. A further sample of the coated substrate is sanded as above at 120 minutes after application. The condition of the wet or dry paper is noted.

Dry Sanding: The coated substrate is sanded with an air driven double action random orbital sander with P360 grade dry sanding paper commercially available from 3M, at 60 minutes after application of the coating. A further sample of the coated substrate is sanded as above at 120 minutes after application. The condition of the dry sanding paper is noted.

Tests for Coating Compositions 27 and 29

'Skydrol' Immersion and Scratch Test: The coated substrate is placed in hot (70° C.) phosphate ester based hydraulic fluid commercially available from Monsanto as 'Skydrol 500' for a period of 14 days. The substrate is then removed from the fluid, wiped dry and a scratch test according to BS 3900 : Part E2 is performed immediately.

Water Immersion and Scratch Test: The coated substrate is placed in a demineralised water bath at a temperature of 23° C. for 14 days. The substrate is then removed from the bath, wiped dry and a scratch test according to BS 3900: Part E2 is performed immediately.

Ultra Violet Light Resistance: The coated substrate is tested for its resistance to ultra violet light according to ASTMS G53. Gloss readings using a 20° gloss meter are taken over a period of three weeks of exposure.

Results

TABLE 6

Sanding Results for Primer Compositions 25 and 26

| Primer Composition | Wet Sanding | | Dry Sanding | |
|---|---|---|---|---|
| | 60 mins | 120 mins | 60 mins | 120 mins |
| 25 | Good | Good | Good | Good |
| 26 | Poor | Good | Poor | Good |

Where:
Good — Surface powders well with acceptable level of clogging of the sanding paper.
Poor — Unacceptable level of clogging of the sanding paper, i.e. the sanding paper either polishes the surface of the coating or tears the film.

It can be seen from Table 7 that Primer Composition which is based on a star polymer has a longer pot life and earlier cure as seen by its early sanding ability.

Tables 7 and 8 show the results for Coating Compositions 27 and 29.

TABLE 7

Results of Scratch Tests for Coating Compositions 27 and 29

| Coating Composition | 'Skydrol' & Scratch | Water & Scratch |
|---|---|---|
| 27 | Pass 1500 g, Fail 2000 g | Pass 2000 g |
| 29 | Pass 1500 g, Pass 2000 g | Pass 2000 g |

TABLE 8

Results of UV Resistance for Coating Compositions 27 and 29

| Coating Composition | U V Resistance (gloss reading) | | | | | | |
|---|---|---|---|---|---|---|---|
| | 0 h | 91 h | 168 h | 220 h | 384 h | 465 h | 552 h |
| 27 | 80.9 | — | 82.9 | — | 81.5 | — | 80.4 |
| 29 | 80.5 | 72.3 | — | 74.8 | — | 60.0 | — | where 'h' is hours of exposure.

It can be seen from Tables 7 and 8 that Coating Composition 27 which is based on a star polymer has an excellent resistance to U V exposure and an acceptable resistance to 'Skydrol'.

We claim:

1. A coating composition comprising a star copolymer having a central hub of trifunctional to octo-functional thiol residues, the central hub having from three to eight polymeric arms where each polymeric arm radiates from one of the thiol residues of the central hub, each polymeric arm being an addition polymer of copolymerized ethylenically unsaturated monomers containing functional units having a crosslinking substituent selected from,
   a hydroxyl group,
   an isocyanate group,
   a blocked isocyanate group,
   an epoxy group,
   a carboxy group or a salt thereof,
   an allyoxyester group,
   a 2-hydroxy-3-allyloxy propyl ester group, or
   mixtures of the foregoing crosslinking substituents,
   where the crosslinking substituent is capable of intermolecular crosslinking with crosslinking agent or with a coreactive crosslinking substituent in another molecule of the state polymer, to provide a crosslinked cured coating film.

2. The coating according to claim 1 where the co-polymer has a total weight average molecular weight of from 3,000 to 150,000 inclusive.

3. The coating according to claim 1 where the co-polymer has 3, 4 or 6 polymeric arms.

4. The coating according to claim 3 where the co-polymer has 4 or 6 polymeric arms.

5. The coating according to claim 4 where the central hub portion is the residue thiol ester formed from a trifunctional to octafunctional alcohol and thio $C_{2-6}$ alkanoic acid.

6. The coating according to claims 5 where the alcohol has formula (1):

where $R^1$ is hydrogen, $C_{1-4}$ alkyl, hydroxy $C_{1-4}$ alkyl, or a group of formula (2):

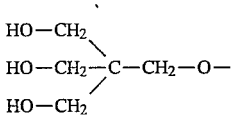

7. The coating according to claim 6 where the thio $C_{2-6}$ alkanoic acid is 2-mercaptoacetic or 3-mercaptopropionic acid.

8. The coating according to claim 1 where each polymeric arm contains the same crosslinking substituent and the crosslinking substituent is, a hydroxyl group, an isocyanate group, an epoxy group, a carboxy group or a salt thereof, an allyloxyester group, or a 2-hydroxy- 3-allyl oxpropyl ester group, and the crosslinking substituent agent is capable of crosslinking with a crosslinking agent.

9. The coating according to claim 1 where the star polymer contains an auxiliary functional unit containing a wetting group.

10. The coating according to claim 9 where the crosslinking substituent is selected from carboxyl, blocked isocyanate, epoxy, allyoxyester or 2-hydroxy-3-allyloxy propyl ester, and the wetting group is 4-nitro or 4-amino benzoyl ester.

11. The coating according to claim 9 where auxiliary functional units of the total average mole percentage of polymeric arm functional units and auxiliary functional units in the star copolymer is 0.5 to 5 mole %.

12. The coating according to claim 9 where the total average mole percentage of functional units and auxiliary functional units in the polymeric arms of the copolymer is from to 70% calculated as a mole percentage of total monomers copolymerized.

13. The coating according to claim 1, where the polymeric arm functional units are derived from allylalcohol or acrylate esters or methacrylate esters, where the acrylate and methacrylate esters are of the formula (3):

where
$R^1$ is hydrogen or methyl and
$R^2$ is $C_{2-6}$ alkane diyl

14. The coating according to claim 13 where $R^2$ is butane-1, 4-diyl and $R^1$ is hydrogen; or $R^1$ is methyl and $R^2$ is ethane-1,2-diyl.

15. The coating according to claim 1 where the polymeric arms are derived from $C_{1-8}$ alkyl esters of acrylic or methacrylic acids, vinyl $C_{2-6}$ alkanoates, styrene, or $C_{1-4}$ alkyl analogues of styrene.

16. The coating according to claim 15 where the polymeric arms are derived from methyl methacrylate, ethyl methacrylate, butyl methacrylate or butyl acrylate.

17. A coating according to claim 1 containing a liquid diluent or carrier.

18. The coating according to claim 1 where the hub portion is the residue of a tetra functional thiol, the crosslinking and coreactive crosslinking substituents are hydroxy groups, and the polymeric arms are copolymerized units of methyl methacrylate and butylacrylate.

19. The coating according to claim 1 where the polymeric arms are copolymerized glycidyl methacrylate.

20. A film forming, crosslinkable star copolymer, the star copolymer having a central hub of trifunctional to octofunctional thiol residues, the central hub having from three to eight polymeric arms where each polymeric arms radiates from one of the thiol residues of the central hub, each polymeric arm being an addition polymer of copolymerized ethylenically unsaturated monomers containing functional units having a crosslinking substituent selected from, a hydroxyl group, an isocyanate group, a blocked isocyanate group, an epoxy group, a carboxy group or a salt thereof, an allyoxyester group, a 2-hydroxy-3-allyloxy propyl ester group, or mixtures of the foregoing crosslinking substituents, where the crosslinking substituent is capable of intermolecular crosslinking with a crosslinking agent or with a coreactive crosslinking substituent in another molecule of the star polymer.

* * * * *